(12) United States Patent
Lee et al.

(10) Patent No.: US 11,206,646 B2
(45) Date of Patent: Dec. 21, 2021

(54) METHOD AND APPARATUS FOR TRANSMITTING OR RECEIVING UPLINK SIGNAL FOR TERMINAL SUPPORTING SHORT TTI IN WIRELESS COMMUNICATION SYSTEM

(71) Applicant: LG Electronics Inc., Seoul (KR)

(72) Inventors: Hyunho Lee, Seoul (KR); Yunjung Yi, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/065,682

(22) PCT Filed: Apr. 2, 2018

(86) PCT No.: PCT/KR2018/003858
§ 371 (c)(1),
(2) Date: Dec. 13, 2018

(87) PCT Pub. No.: WO2018/182383
PCT Pub. Date: Oct. 4, 2018

(65) Prior Publication Data
US 2020/0337079 A1    Oct. 22, 2020

Related U.S. Application Data

(60) Provisional application No. 62/643,718, filed on Mar. 15, 2018, provisional application No. 62/636,162, (Continued)

(51) Int. Cl.
*H04W 72/04* (2009.01)
*H04L 1/18* (2006.01)
(Continued)

(52) U.S. Cl.
CPC ........ *H04W 72/042* (2013.01); *H04L 1/1861* (2013.01); *H04L 5/00* (2013.01);
(Continued)

(58) Field of Classification Search
CPC ........ H04L 1/1861; H04L 5/00; H04W 72/02; H04W 72/04; H04W 72/0413;
(Continued)

(56) References Cited

U.S. PATENT DOCUMENTS 10,117,188 B2 * 10/2018 Nory ..................... H04L 1/1861
10,251,200 B2 *  4/2019 Hosseini ............. H04W 52/367
(Continued)

FOREIGN PATENT DOCUMENTS

AU      2017396800 A1 *  7/2019  ........ H04W 72/0473
BR   112019015820 A2 *  3/2020  .......... H04W 52/367
(Continued)

OTHER PUBLICATIONS

LG Electronics et al., WF on handling PUSCH and sPUSCH fora UE in the same subframe on a given carrier, Nov. 14, 2016, 3GPP, 3GPP TSG RAN1 #87, Tdoc: R1-1613407 (Year: 2016).*
(Continued)

*Primary Examiner* — Eric Nowlin
(74) *Attorney, Agent, or Firm* — Fish & Richardson P.C.

(57) ABSTRACT

An uplink transmitting method for a user equipment (UE) for supporting a short transmission time interval (TTI) in a wireless communication includes receiving downlink control information including uplink grant, and when a transmitting timing of an uplink signal corresponding to the uplink grant and a transmission timing of a semi-persistent (SPS) uplink signal overlap with each other, if a TTI length of a first channel in which the uplink signal corresponding to the uplink grant is to be transmitted is longer than a TTI length of a second channel in which the SPS uplink signal is to be transmitted, performing uplink signal transmission only on the second channel of the first channel and the second channel at the transmission timing.

3 Claims, 9 Drawing Sheets

(a)

(b)

Related U.S. Application Data filed on Feb. 28, 2018, provisional application No. 62/617,575, filed on Jan. 15, 2018, provisional application No. 62/586,128, filed on Nov. 14, 2017, provisional application No. 62/566,347, filed on Sep. 30, 2017, provisional application No. 62/480,368, filed on Apr. 1, 2017.

(51) Int. Cl.
  *H04W 72/14* (2009.01)
  *H04L 5/00* (2006.01)
  *H04W 72/12* (2009.01)

(52) U.S. Cl.
  CPC ... *H04W 72/0413* (2013.01); *H04W 72/1268* (2013.01); *H04W 72/1284* (2013.01); *H04W 72/14* (2013.01); *H04W 72/0446* (2013.01)

(58) Field of Classification Search
  CPC .......... H04W 72/0446; H04W 72/12; H04W 72/1242; H04W 72/1263; H04W 72/1268; H04W 72/1284; H04W 72/14
  See application file for complete search history.

(56) References Cited

U.S. PATENT DOCUMENTS

| | | | |
|---|---|---|---|
| 10,278,136 B2 * | 4/2019 | Nory | H04W 52/346 |
| 10,397,886 B2 * | 8/2019 | Akula | H04W 52/367 |
| 10,536,975 B2 * | 1/2020 | Hosseini | H04W 72/0446 |
| 10,588,161 B2 * | 3/2020 | Bagheri | H04W 74/085 |
| 10,623,147 B2 * | 4/2020 | Hwang | H04B 7/26 |
| 10,674,531 B2 * | 6/2020 | Falconetti | H04L 1/1854 |
| 10,728,922 B2 * | 7/2020 | Bagheri | H04W 72/042 |
| 10,798,664 B2 * | 10/2020 | Lee | H04W 52/242 |
| 10,939,470 B2 * | 3/2021 | Hosseini | H04W 74/0816 |
| 10,993,193 B2 * | 4/2021 | Lee | H04W 72/0446 |
| 2012/0236736 A1 | 9/2012 | Frank et al. | |
| 2015/0098371 A1 * | 4/2015 | Vajapeyam | H04L 1/1861 370/280 |
| 2015/0264662 A1 * | 9/2015 | Sahlin | H04W 72/04 370/280 |
| 2015/0341864 A1 | 11/2015 | Yang et al. | |
| 2016/0192376 A1 | 6/2016 | Lee et al. | |
| 2017/0013565 A1 | 1/2017 | Pelletier et al. | |
| 2017/0013618 A1 | 1/2017 | Shin | |
| 2017/0026942 A1 | 1/2017 | Vajapeyam et al. | |
| 2017/0195031 A1 | 7/2017 | Onggosanusi et al. | |
| 2017/0223695 A1 | 8/2017 | Kwak et al. | |
| 2017/0238314 A1 * | 8/2017 | Zhang | H04W 72/042 370/336 |
| 2017/0288819 A1 | 10/2017 | Chen et al. | |
| 2017/0303302 A1 * | 10/2017 | Bagheri | H04W 72/1284 |
| 2017/0318594 A1 | 11/2017 | Babaei et al. | |
| 2017/0367110 A1 | 12/2017 | Li et al. | |
| 2018/0007673 A1 * | 1/2018 | Fwu | H04L 5/0037 |
| 2018/0048432 A1 | 2/2018 | Sun et al. | |
| 2018/0077651 A1 * | 3/2018 | Nory | H04L 5/0007 |
| 2018/0110042 A1 * | 4/2018 | Chen | H04L 5/0057 |
| 2018/0167933 A1 | 6/2018 | Yin et al. | |
| 2018/0167946 A1 | 6/2018 | Si et al. | |
| 2018/0176935 A1 | 6/2018 | Li et al. | |
| 2018/0227955 A1 * | 8/2018 | Hosseini | H04W 72/0446 |
| 2018/0270794 A1 * | 9/2018 | Tiirola | H04L 5/0048 |
| 2018/0279358 A1 | 9/2018 | Babaei et al. | |
| 2018/0279376 A1 | 9/2018 | Dinan et al. | |
| 2018/0324778 A1 * | 11/2018 | Farajidana | H04L 5/0092 |
| 2018/0332605 A1 * | 11/2018 | Pelletier | H04W 72/1242 |
| 2018/0375619 A1 * | 12/2018 | Hwang | H04W 72/0446 |
| 2019/0007910 A1 * | 1/2019 | Akula | H04W 52/52 |
| 2019/0028975 A1 * | 1/2019 | Nory | H04L 1/1861 |
| 2019/0045556 A1 * | 2/2019 | Bagheri | H04W 74/0858 |
| 2019/0068317 A1 | 2/2019 | Babaei et al. | |
| 2019/0110311 A1 * | 4/2019 | Falconetti | H04W 72/0453 |
| 2019/0116608 A1 | 4/2019 | Kim et al. | |
| 2019/0132837 A1 * | 5/2019 | Yl | H04W 72/0446 |
| 2019/0149365 A1 | 5/2019 | Chatterjee et al. | |
| 2019/0182867 A1 * | 6/2019 | Hosseini | H04W 52/367 |
| 2019/0190763 A1 * | 6/2019 | Takeda | H04W 28/06 |
| 2019/0229878 A1 * | 7/2019 | Takeda | H04W 72/02 |
| 2019/0239196 A1 * | 8/2019 | Lee | H04L 5/0055 |
| 2019/0246432 A1 * | 8/2019 | Hosseini | H04L 1/1864 |
| 2019/0261415 A1 * | 8/2019 | Hosseini | H04W 72/1242 |
| 2019/0349046 A1 * | 11/2019 | Liu | H04B 17/336 |
| 2020/0015256 A1 | 1/2020 | Lee et al. | |
| 2020/0178297 A1 | 6/2020 | Park et al. | |
| 2020/0196302 A1 * | 6/2020 | Takeda | H04W 72/04 |
| 2020/0214050 A1 * | 7/2020 | Bagheri | H04W 74/006 |
| 2020/0336268 A1 * | 10/2020 | Shi | H04L 5/0048 |
| 2020/0344793 A1 * | 10/2020 | Bagheri | H04W 72/1257 |
| 2020/0344794 A1 * | 10/2020 | Bagheri | H04W 72/1257 |
| 2020/0344795 A1 * | 10/2020 | Bagheri | H04W 72/042 |

FOREIGN PATENT DOCUMENTS

| | | | | |
|---|---|---|---|---|
| CA | 3048818 A1 | * | 8/2018 | ........ H04W 72/0473 |
| CN | 102160319 | | 8/2011 | |
| CN | 108650709 A | * | 10/2018 | |
| CN | 110249673 A | * | 9/2019 | ........ H04W 74/0816 |
| CN | 110603881 A | * | 12/2019 | ........ H04W 72/1268 |
| CN | 110800344 A | * | 2/2020 | ........... H04L 5/0098 |
| CN | 110870362 A | * | 3/2020 | ........ H04W 72/0446 |
| EP | 2962408 | | 1/2016 | |
| EP | 3437410 A1 | * | 2/2019 | ........ H04W 72/1284 |
| EP | 3437410 A4 | * | 10/2019 | ........ H04W 72/0446 |
| EP | 3577970 A1 | * | 12/2019 | ........ H04W 72/0446 |
| EP | 3620015 A1 | * | 3/2020 | ........... H04W 74/085 |
| EP | 3621373 A1 | * | 3/2020 | ........ H04W 72/0413 |
| EP | 3646644 A1 | * | 5/2020 | ........ H04W 52/346 |
| JP | WO2018203409 A1 | * | 3/2020 | ............ H04W 72/04 |
| KR | 1020140072187 | | 6/2014 | |
| WO | WO2014133320 | | 9/2014 | |
| WO | WO2016034196 | | 3/2016 | |
| WO | WO-2017128312 A1 | * | 8/2017 | ........... H04L 1/1621 |
| WO | WO-2017171615 A1 | * | 10/2017 | ........ H04W 72/0446 |
| WO | WO-2018144155 A1 | * | 8/2018 | ........ H04W 72/0446 |
| WO | WO-2018203409 A1 | * | 11/2018 | ............ H04W 72/04 |
| WO | WO-2018204892 A1 | * | 11/2018 | ........ H04W 74/0858 |
| WO | WO-2018207369 A1 | * | 11/2018 | .......... H04W 72/042 |
| WO | WO-2019005912 A1 | * | 1/2019 | ........... H04W 52/38 |
| WO | WO-2019161029 A1 | * | 8/2019 | ........ H04W 72/1284 |

OTHER PUBLICATIONS

LG Electronics et al., WF on collision handling PUSCH and sPUSCH, Feb. 13, 2017, 3GPP, 3GPP TSG RAN1 #88, Tdoc: R1-1703901 (Year: 2017).*

Nokia et al., WF on PUSCH collision handling with n+3 and n+4 timing, Feb. 13, 2017, 3GPP, 3GPP TSG RAN1 #88, Tdoc: R1-1703909 (Year: 2017).*

LG Electronics et al., WF on collision handling of sPUCCH and sPUSCH, Feb. 13, 2017, 3GPP, 3GPP TSG RAN1 #88, Tdoc: R1-1704013 (Year: 2017).*

Huawei et al., Handling collisions between n+4 and n+3 for FS2, Oct. 9, 2017, 3GPP TSG RAN WG1 Meeting #90bis, Tdoc: R1-1717124 (Year: 2017).*

Nokia et al., Remaining details of collision handling between n+3 and n+4, Oct. 9, 2017, 3GPP TSG RAN WG1 Meeting #90bis, Tdoc: R1-1717235 (Year: 2017).*

Samsung, Handling collisions between n+4 and n+3, Oct. 9, 2017, 3GPP TSG RAN WG1 Meeting #90bis, Tdoc: R1-1717526 (Year: 2017).*

Zte et al., Remaining issues of handling collisions between n+4 and n+3, Oct. 9, 2017, 3GPP TSG RAN WG1 Meeting #90bis, Tdoc: R1-1717696 (Year: 2017).*

Zte et al., Collision handling of 1ms TTI and sTTI in uplink, Oct. 9, 2017, 3GPP TSG RAN WG1 Meeting #90bis, Tdoc: RI-1717697 (Year: 2017).*

Qualcomm Incorporated, Handling collisions between n+4 and n+3, Oct. 9, 2017, 3GPP TSG RAN WG1 Meeting #90bis, Tdoc: R1-1718099 (Year: 2017).*

(56) References Cited

OTHER PUBLICATIONS

LG Electronics, Email discussion [90-12] on sPUSCH/sPUCCH power control and remaining issues on collisions in UL, Oct. 9, 2017, 3GPP TSG RAN WG1 Meeting #90bis, Tdoc: R1-1718793 (Year: 2017).*
LG Electronics, Remaining issues on collision handling between different TTI lengths, Oct. 9, 2017, 3GPP TSG RAN WG1 Meeting #90bis, Tdoc: R1-1719855 (Year: 2017).*
LG Electronics, Summary of email approval [90b-LTE-12] on sPUSCH/sPUCCH power control and UL collision handling between different TTI lengths, Nov. 27, 2017, 3GPP TSG RAN WG1 Meeting #91, Tdoc: R1-1719856 (Year: 2017).*
ITRI, Remaining details on uplink collision handling between different TTI lengths, Nov. 27, 2017, 3GPP TSG RAN WG1 Meeting #91, Tdoc: R1-1720768 (Year: 2017).*
Huawei et al., Text proposal on collision between PUCCH format 1/1a/1b/3 and sPUCCH/sPUSCH, Feb. 26, 2018, 3GPP TSG RAN WG1 Meeting #92, Tdoc: R1-1802786 (Year: 2017).*
LG Electronics, Discussion on collisions between TTI and sTTI, Nov. 14, 2016, 3GPP TSG RAN WG1 Meeting #87, Tdoc: R1-1611772 (Year: 2016).*
Huawei et al., Handling collision between sPUCCH/PUCCH and PUSCH/sPUSCH, Nov. 14, 2016, 3GPP TSG RAN WG1 Meeting #87, Tdoc: R1-1612828 (Year: 2016).*
NTT Docomo, Inc., Handling collisions between n+4 and n+3, Feb. 13, 2017, 3GPP TSG RAN WG1 Meeting #88, Tdoc: R1-1702773 (Year: 2017).*
NTT Docomo, Inc., Collision handling between sTTI and TTI for UL, Feb. 13, 2017, 3GPP TSG RAN WG1 Meeting #88, Tdoc: R1-1702780 (Year: 2017).*
Samsung, Collision handling ofsTTI and TTI in UL, Feb. 13, 2017, 3GPP TSG RAN WG1 Meeting #88, Tdoc: R1-1702885 (Year: 2017).*
LG Electronics et al., WF on collision handling PUSCH and sPUSCH, Apr. 3, 2017, 3GPP TSG RAN WG1 Meeting #88bis, Tdoc: R1-1706368 (Year: 2017).*
LG Electronics et al., WF on further collision handling PUSCH and sPUSCH, May 15, 2017, 3GPP TSG RAN WG1 Meeting #89, Tdoc: R1-1709429 (Year: 2017).*
LG Electronics et al., WF on UCI handling for collision of PUSCH and sPUSCH, Aug. 21, 2017, Tdoc: R1-1714781 (Year: 2017).*
OPPO, Aspects related to collision handling for subslot—PUSCH, May 21, 2018, 3GPP TSG RAN WG1 Meeting #93, Tdoc: R1-1806857 (Year: 2018).*
OPPO, Collision handling for subslot—PUSCH, May 21, 2018, 3GPP TSG RAN WG1 Meeting #93, Tdoc: R1-1807555 (Year: 2018).*
Huawei et al., Discussion on the 1ms HARQ-ACK transmission for the collision between sPUSCH and PUCCH/PUSCH, Nov. 12, 2018, 3GPP TSG RAN WG1 Meeting #95, Tdoc: R1-1813632 (Year: 2018).*
Huawei et al., Correction on the 1ms HARQ-ACK transmission for the collision between sPUSCH and PUCCH/PUSCH, Nov. 12, 2018, 3GPP TSG RAN WG1 Meeting #95, Tdoc: R1-1813777 (Year: 2018).*
Huawei et al., Correction on the 1ms HARQ-ACK transmission for the collision between sPUSCH and PUCCH/PUSCH, Feb. 25, 2019, 3GPP TSG RAN WG1 Meeting #96, Tdoc: R1-1902950 (Year: 2019).*
Huawei et al., Correction on the 1ms HARQ-ACK transmission for the collision between sPUSCH and PUCCH/PUSCH, Feb. 25, 2019, 3GPP TSG RAN WG1 Meeting #96, Tdoc: R1-1903307 (Year: 2019).*
Ericsson, "sPUCCH Utilization Strategy," R2-1708616, 3GPP TSG-RAN WG2 #99, Berlin, Germany, dated Aug. 21-25, 2017, 2 pages.
Japanese Office Action in Japanese Application No. 2019-533225, dated Jun. 16, 2020, 5 pages (with English translation).
Vivo, "Collision Between Grant-based and Grant-free Resources on the Same UL Carrier," R2-1708488, 3GPP TSG-RAN WG2 Meeting#99, Berlin, Germany, dated Aug. 21-25, 2017, 4 pages.
Vivo, "HARQ process forUL grant-free transmission," R2-1708487, 3GPP TSG-RAN WG2 Meeting#99, Berlin, Germany, dated Aug. 21-25, 2017, 4 pages.
Huawei et al., "Discussion on collision of sTTI/TTI in UL," 3GPP TSG RAN WG1 Meeting #88bis, dated Apr. 3-7, 2017, 10 pages.
Huawei et al., "Introduction of SPS into short TTI," 3GPP TSG-RAN WG2 Meeting #97bis, dated Apr. 3-7, 2017, 4 pages.
NTT Docomo, Inc., "Collision handling between sTTI and TTI for UL," 3GPP TSG RAN WG1 Meeting #88bis, Apr. 3-7, 2017, 6 pages.
Huawei et al., "Multiplexing and LCP procedure of Different TTIs," 3GPP TSG-RAN WG2 Meeting #97bis, Apr. 3-7, 2017, 4 pages.
United States Final Office Action in U.S. Appl. No. 16/379,325, dated Aug. 26, 2020, 23 pages.
United States Office Action in U.S. Appl. No. 16/379,325, dated Jul. 10, 2019, 14 pages.
Huawei et al., R2-1703645, "Introduction of SPS into short TTI," 3GPP TSG RAN WG2 #97bis, 3GPP server publication date (Mar. 25, 2017), 3 pages.
CATT, "Discussion on multiplexing of normal TTI and sTTI in UL," Rl-1702047, 3GPP TSG RAN WG1 Meeting #88, Athens, Greece, dated Feb. 13-17, 2017, 5 pages, XP051209208.
Ericsson, "Handling overlapping allocations with short and 1 ms TTI," R1-1703258, 3GPP TSG-RAN WG1 Meeting #88, Athens, Greece, dated Feb. 13-17, 2017, 5 pages, XP051210388.
Extended European Search Report in European Application No. 18777481.5, dated Jan. 3, 2020, 9 pages.
United States Office Action in U.S. Appl. No. 16/379,325, dated Jan. 17, 2020, 12 pages.
U.S. Office Action in U.S. Appl. No. 16/379,325, dated Dec. 24, 2020, 11 pages.
CN Office Action in Chinese Appln. No. 201880003938.5, dated Mar. 31, 2021, 12 pages (with English translation).
Huawei, HiSilicon, "Introduction of SPS into short TTI," R2-1703645, 3GPP TSG-RAN WG2 Meeting #97bis, Spokane, USA, dated Apr. 3-7, 2017, 3 pages.
IN Office Action in Indian Appln. No. 201927023000, dated Feb. 26, 2021, 9 pages (with English translation).
Ericsson, "Handling collisions of sTTI and TTI in UL," R1-1706073, 3GPP TSG-RAN WG1 Meeting #88bis, Spokane, USA, dated Apr. 3-7, 2017, 4 pages.
Extended European Search Report in European Appln. No. 21182530.2, dated Aug. 12, 2021, 9 pages.
LG Electronics, "Processing time reduction for latency reduction," R1-165429, Presented at 3GPP TSG RAN WG1 Meeting #85, Nanjing, China May 2-23, 2016, 7 pages.

* cited by examiner

FIG. 7
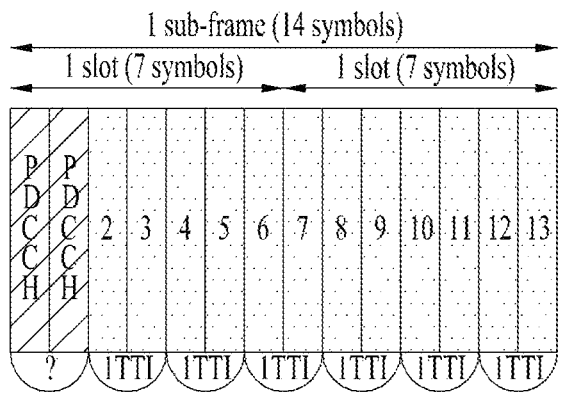
(a) 2 symbol TTI DL structure
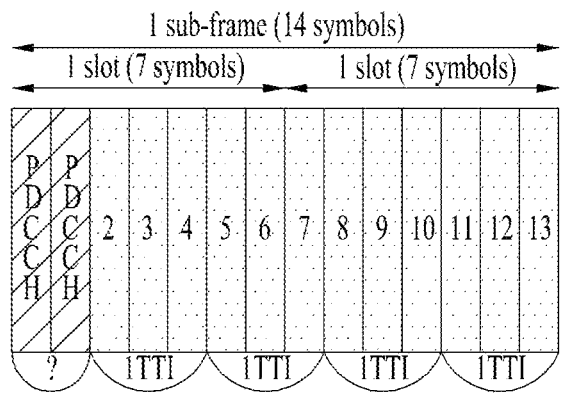
(b) 3 symbol TTI DL structure
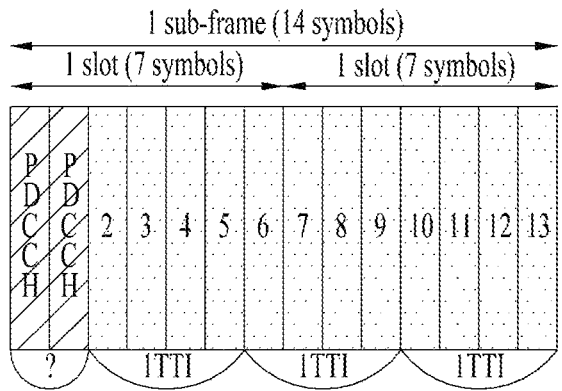
(c) 4 symbol TTI DL structure
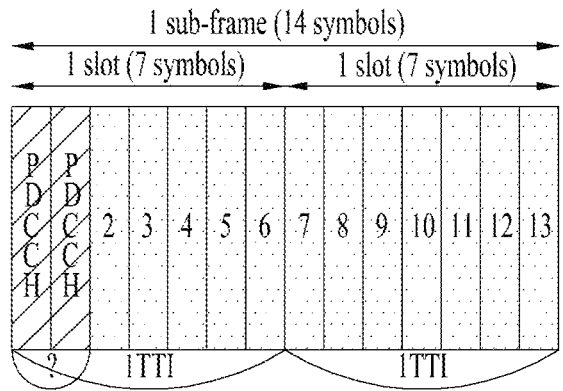
(d) 7 symbol TTI DL structure

METHOD AND APPARATUS FOR TRANSMITTING OR RECEIVING UPLINK SIGNAL FOR TERMINAL SUPPORTING SHORT TTI IN WIRELESS COMMUNICATION SYSTEM

CROSS-REFERENCE TO RELATED APPLICATIONS

This application is a National Stage application under 35 U.S.C. § 371 of International Application No. PCT/KR2018/003858, filed on Apr. 2, 2018, which claims the benefit of U.S. Provisional Application No. 62/643,718, filed on Mar. 15, 2018, U.S. Provisional Application No. 62/636,162, filed on Feb. 28, 2018, U.S. Provisional Application No. 62/617,575, filed on Jan. 15, 2018, U.S. Provisional Application No. 62/586,128, filed on Nov. 14, 2017, U.S. Provisional Application No. 62/566,347, filed on Sep. 30, 2017, and U.S. Provisional Application No. 62/480,368, filed on Apr. 1, 2017. The disclosures of the prior applications are incorporated by reference in their entirety.

TECHNICAL FIELD

The present invention relates to a wireless communication system, and more particularly, a method and apparatus for supporting a plurality of transmission time intervals, a plurality of subcarrier spacing, or a plurality of processing times.

BACKGROUND ART

Latency of packet data is one of important performance metrics and one of important objectives in designs of a next-generation mobile communication system as well as LTE, a so-called new RAT, is to reduce latency and to provide rapider Internet access to an end user.

The present invention proposes the feature related to a method of transmitting or receiving an uplink (UL) signal in a wireless communication system for supporting reduction in latency.

DISCLOSURE

Technical Problem

An object of the present invention devised to solve the problem lies in an uplink (UL) transmission operation of a user equipment (UE) for supporting a plurality of transmission time interval, a plurality of subcarrier spacing, or a plurality of processing times or a UL receiving operation of an eNB that communicates with the UE.

It is to be understood that both the foregoing general description and the following detailed description of the present invention are exemplary and explanatory and are intended to provide further explanation of the invention as claimed.

Technical Solution

The object of the present invention can be achieved by providing an uplink transmitting method for a terminal for supporting a short transmission time interval (TTI) length in a wireless communication, the method including receiving downlink control information including uplink grant, and when a transmitting timing of an uplink signal corresponding to the uplink grant and a transmission timing of a semi-persistent (SPS) uplink signal overlap with each other, and when a TTI length of a first channel on which the uplink signal corresponding to the uplink grant is to be transmitted is longer than a TTI length of a second channel on which the SPS uplink signal is to be transmitted, performing uplink signal transmission only on the second channel of the first channel and the second channel at the transmission timing.

Additionally or alternatively, the method may further include when second downlink control information including second uplink grant for scheduling transmission of a physical uplink shared channel (PUSCH) with a shorter length than the TTI length of the first channel is received during a time period from a next subframe ("subframe # n+1") of a subframe in which the downlink control information is received to a subframe ("subframe # n+k"), in which the uplink signal corresponding to the uplink grant is to be transmitted, transmitting the uplink signal corresponding to the uplink grant on a physical uplink control channel (PUCCH) in the subframe # n+k.

Additionally or alternatively, the method may further include, when second downlink control information including second uplink grant for scheduling transmission of a physical uplink shared channel (PUSCH) with a shorter length than the TTI length of the first channel is received during a time period from a next subframe ("subframe # n+1") of a subframe in which the downlink control information is received to a subframe ("subframe # n+k"), in which the uplink signal corresponding to the uplink grant is to be transmitted, transmitting the uplink signal corresponding to the uplink grant on a shortened PUCCH (SPUCCH) in an n*TTI with a shorter length than the TTI length of the first channel in the subframe # n+k, where n is preconfigured.

Additionally or alternatively, the method may further include, when second downlink control information including second uplink grant for scheduling transmission of a physical uplink shared channel (PUSCH) with a shorter length than the TTI length of the first channel is received during a time period from a next subframe ("subframe # n+1") of a subframe in which the downlink control information is received to a subframe ("subframe # n+k"), in which the uplink signal corresponding to the uplink grant is to be transmitted, transmitting the uplink signal corresponding to the uplink grant on a first channel that does not include data in the subframe # n+k.

Additionally or alternatively, transmission power may be used only in a symbol to which the uplink signal is mapped in the subframe # n+k.

Additionally or alternatively, transmission power may be used only in a resource block to which the uplink signal is mapped among resource blocks indicated by the downlink control information in the subframe # n+k.

In another aspect of the present invention, provided herein is a terminal for transmitting an uplink signal with a short transmission time interval (TTI) length in a wireless communication system, including a receiver and a transmitter, and a processor that controls the receiver and the transmitter, wherein the processor may receive downlink control information including uplink grant and configured to, when a transmitting timing of an uplink signal corresponding to the uplink grant and a transmission timing of a semi-persistent (SPS) uplink signal overlap with each other, and when a TTI length of a first channel on which the uplink signal corresponding to the uplink grant is to be transmitted is longer than a TTI length of a second channel on which the SPS uplink signal is to be transmitted, perform uplink signal transmission only on the second channel of the first channel and the second channel at the transmission timing.

Additionally or alternatively, when second downlink control information including second uplink grant for scheduling transmission of a physical uplink shared channel (PUSCH) with a shorter length than the TTI length of the first channel is received during a time period from a next subframe ("subframe # n+1") of a subframe in which the downlink control information is received to a subframe ("subframe # n+k") in which the uplink signal corresponding to the uplink grant is to be transmitted, the processor may transmit the uplink signal corresponding to the uplink grant on a physical uplink control channel (PUCCH) in the subframe # n+k.

Additionally or alternatively, when second downlink control information including second uplink grant for scheduling transmission of a physical uplink shared channel (PUSCH) with a shorter length than the TTI length of the first channel is received during a time period from a next subframe ("subframe # n+1") of a subframe in which the downlink control information is received to a subframe ("subframe # n+k") in which the uplink signal corresponding to the uplink grant is to be transmitted, the processor may transmit the uplink signal corresponding to the uplink grant on a shortened PUCCH (SPUCCH) in an $n^{th}$ TTI with a shorter length than the TTI length of the first channel in the subframe # n+k, where n is preconfigured.

Additionally or alternatively, when second downlink control information including second uplink grant for scheduling transmission of a physical uplink shared channel (PUSCH) with a shorter length than the TTI length of the first channel is received during a time period from a next subframe ("subframe # n+1") of a subframe in which the downlink control information is received to a subframe ("subframe # n+k") in which the uplink signal corresponding to the uplink grant is to be transmitted, the processor may transmit the uplink signal corresponding to the uplink grant on a first channel that does not include data in the subframe # n+k.

Additionally or alternatively, transmission power may be used only in a symbol to which the uplink signal is mapped in the subframe # n+k.

Additionally or alternatively, transmission power may be used only in a resource block to which the uplink single is mapped among resource blocks indicated by the downlink control information in the subframe # n+k.

It is to be understood that both the foregoing general description and the following detailed description of the present invention are exemplary and explanatory and are intended to provide further explanation of the invention as claimed.

Advantageous Effects

According to embodiments of the present invention, uplink (UL) transmission of a user equipment (UE) for supporting a plurality of transmission time interval (TTI) lengths, a plurality of subcarrier spacing, or a plurality of processing times may be effectively performed.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 7 is a diagram showing a DL subframe structure including a short TTI with a plurality of lengths (symbol numbers);

BEST MODE

Figure 1:
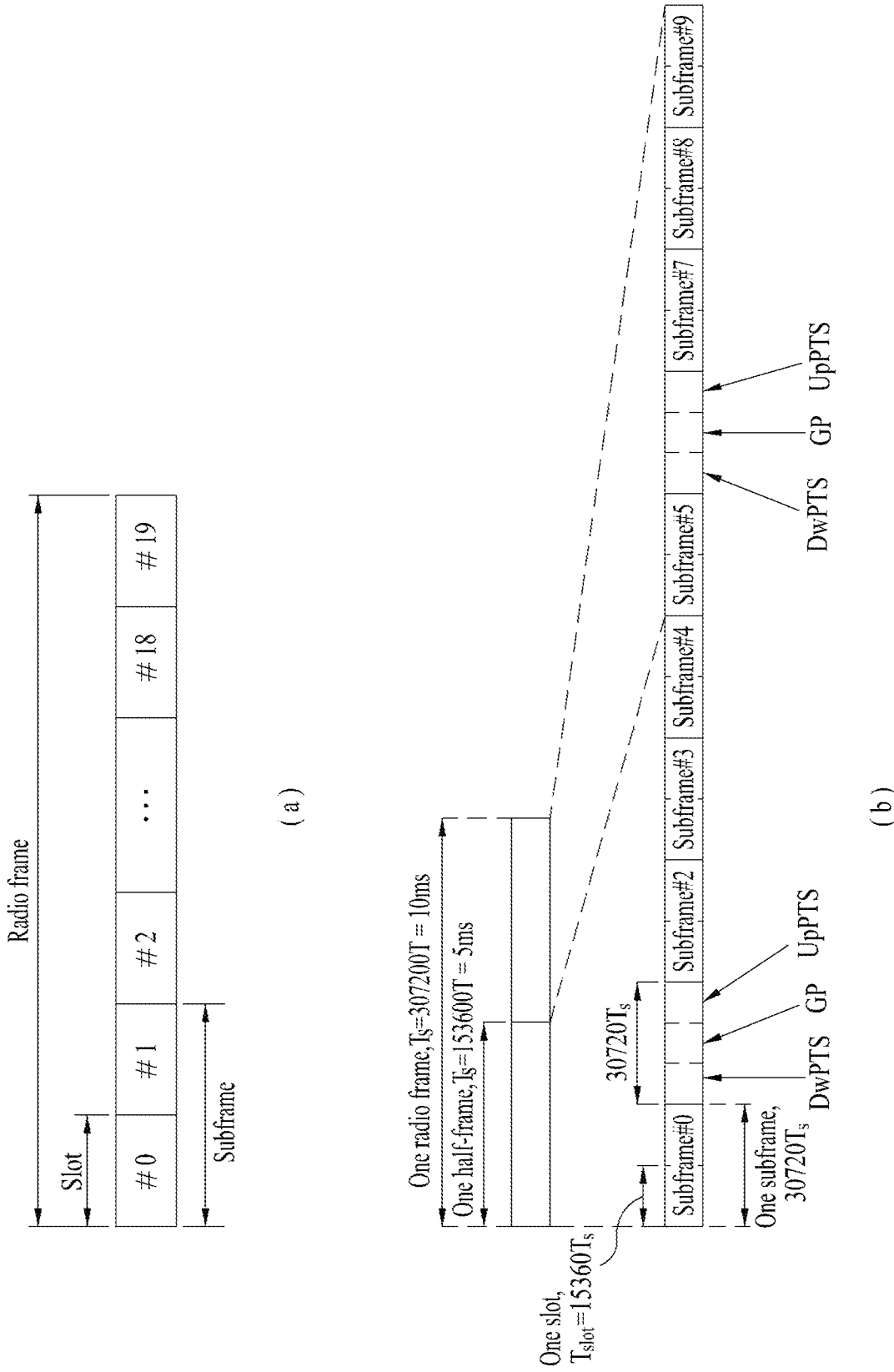
FIG. 1 is a diagram showing an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control InformationyCFI (Control Format Indicatorydownlink ACK/NACK (Acknowledgement/Negative ACKYdownlink data. In addition, PUCCH (Physical Uplink Control ChannelYPUSCH (Physical Uplink Shared Channel)/ PRACH (Physical Random Access Channel) refer to sets of time-frequency resources or resource elements respectively carrying UCI (Uplink Control Informationyuplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/
PRACH RE or PDCCH/PCFICH/PHICH/PDSCH/PUCCH/
PUSCH/PRACH resource. In the following description, transmission of PUCCH/PUSCH/PRACH by a UE is equivalent to transmission of uplink control information/ uplink data/random access signal through or on PUCCH/ PUSCH/PRACH. Furthermore, transmission of PDCCH/

PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (30720 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
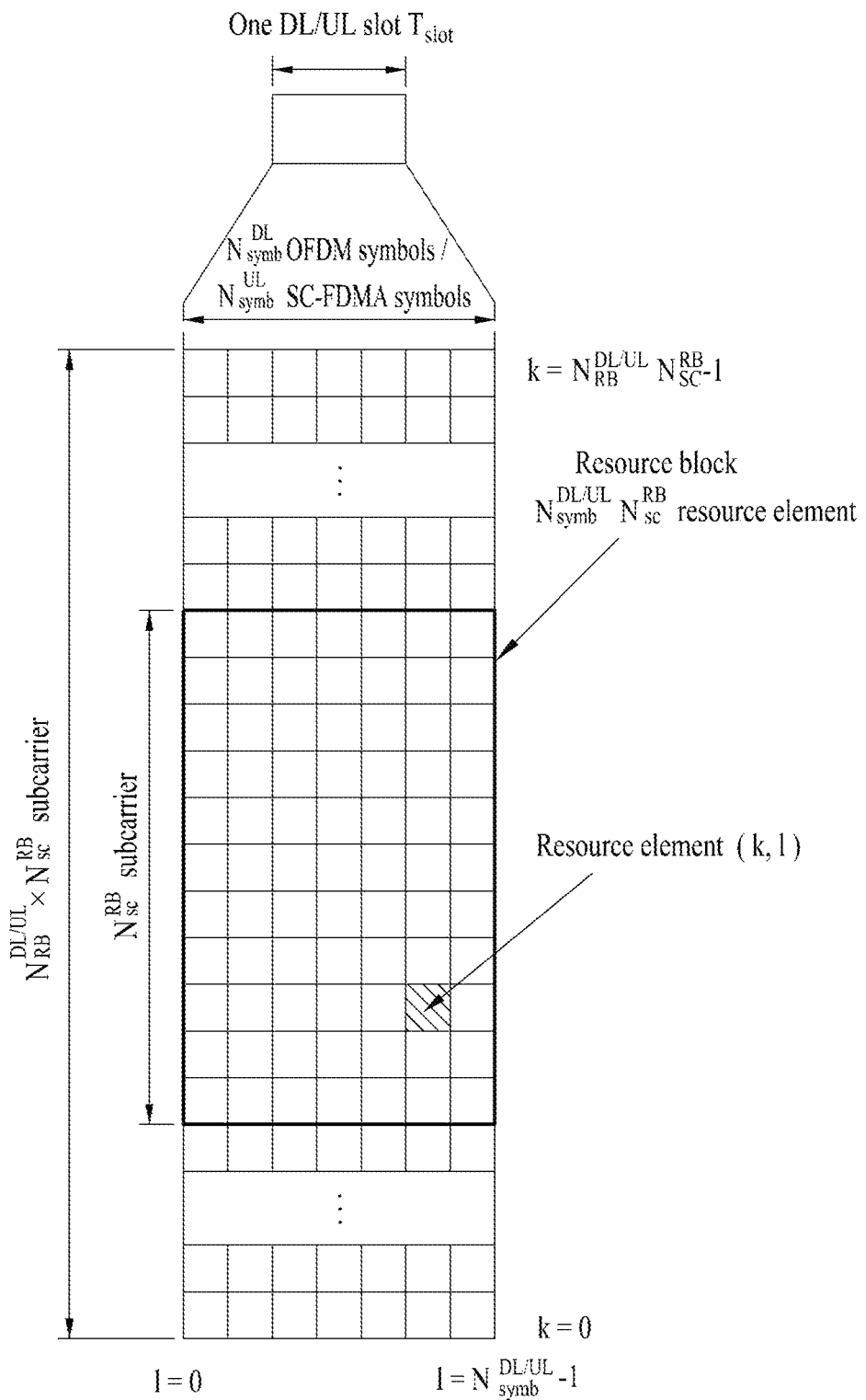
FIG. 2 is a diagram showing an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0)

during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, 1) in a slot. Here, k is an index in the range of 0 to $N_{symb}^{DL/UL}*N_{sc}^{RB}-1$ in the frequency domain and 1 is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
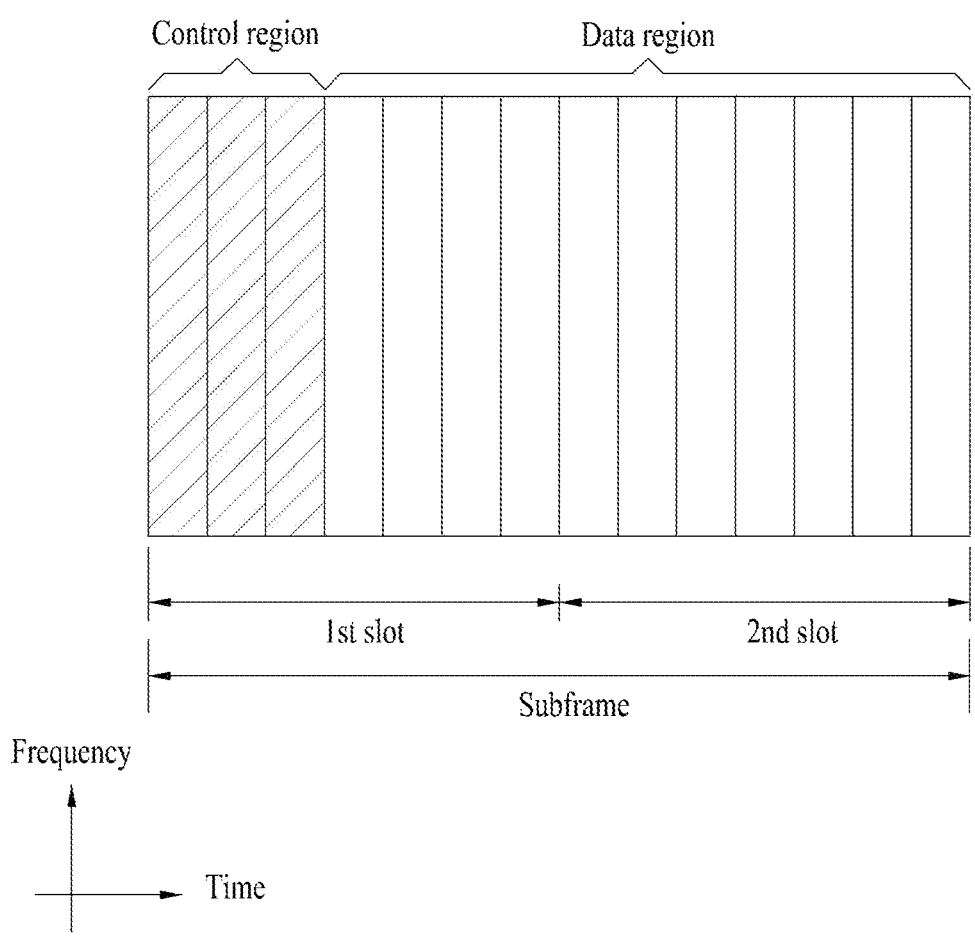
FIG. 3 is a diagram showing an example of a DL subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space Aggregation Level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
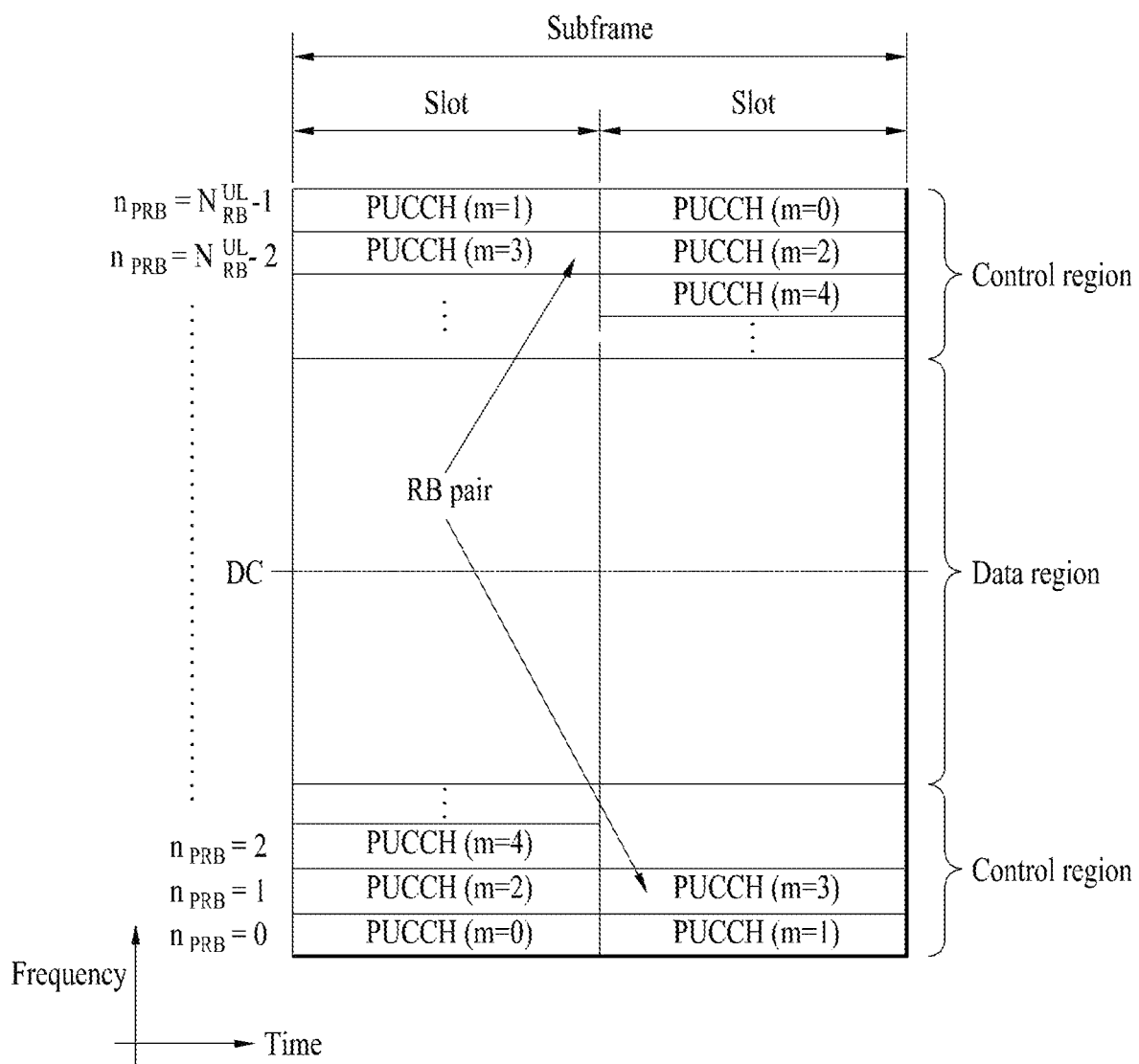
FIG. 4 is a diagram showing an example of a UL subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |

TABLE 4-continued

| PUCCH format | Modulation scheme | Number of bits per subframe, $M_{bit}$ | Usage | Etc. |
| --- | --- | --- | --- | --- |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Figure 5:
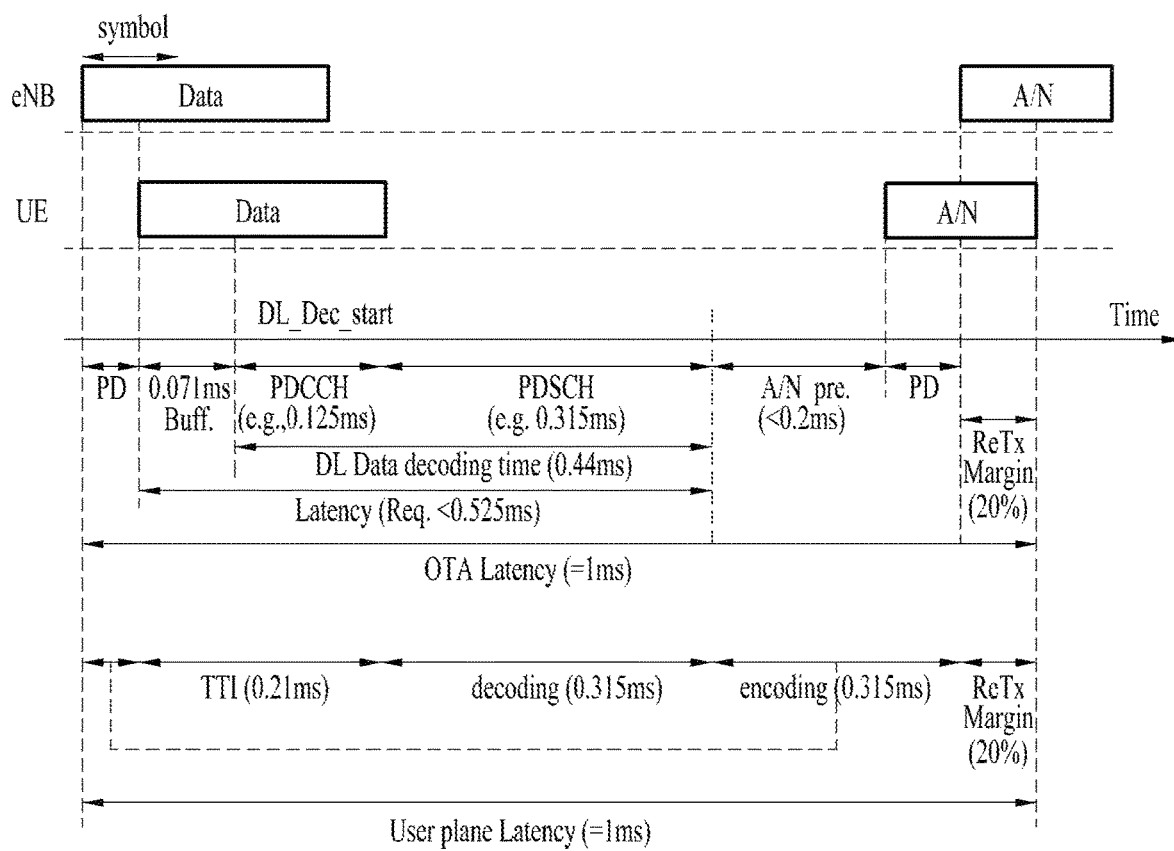
FIG. 5 is a diagram showing reduction in a TTI length according to reduction in user plane latency.

To satisfy the aforementioned reduction in latency, i.e., low latency, it may be required to reduce TTI that is a minimum unit of data transmission to newly design a shortened TTI (sTTI) of 0.5 msec or less. For example, as illustrated in FIG. 5, to shorten user plane (U-plane) latency to a time point when a UE completely transmits ACK/NACK (A/N) from a time point when an eNB begins to transmit data (PDCCH and PDSCH) to 1 msec, a sTTI may be configured in units of about 3 OFDM symbols.

Figure 6:
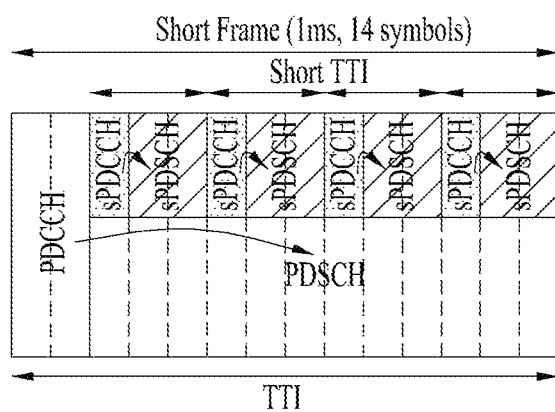
FIG. 6 is a diagram showing an example in which a plurality of short TTIs is set in one subframe.

In a DL environment, a PDCCH (i.e., sPDCCH) for data transmission/scheduling in such a sTTI and a PDSCH (i.e., sPDSCH) for transmission in the sTTI may be transmitted and, for example, as illustrated in FIG. 6, a plurality of sTTIs may be configured using different OFDM symbols in one subframe. Particularly, OFDM symbols included in the sTTI may be configured by excluding OFDM symbols transmitted by legacy control channels. The sPDCCH and the sPDSCH may be transmitted in the sTTI in the form of time division multiplexing (TDM) using different OFDM symbol regions and may be transmitted in the form of frequency division multiplexing (FDM) using different PRB domain/frequency resources.

In a UL environment as similar with the DL environment, data transmission/scheduling in a sTTI is allowed, channels corresponding to a legacy TTI based PUCCH and PUSCH are referred to as sPUCCH and sPUSCH, respectively.

In the specification, the present invention is described below in terms of an LTE/LTE-A system. In an existing LTE/LTE-A, when having a normal CP, a subframe of 1 ms may include 14 OFDM symbols and, when a symbol is configured with a TTI in a shorter unit than 1 ms, a plurality of TTIs may be configured in one subframe. A method of configuring a plurality of TTIs may configure two symbols, three symbols, four symbols, and seven symbols as one TTI, as in an embodiment shown in FIG. 7 below. Although not shown, the case in which one symbol is configured as a TTI may also be configured. When one symbol is one TTI unit, 12 TTIs may be generated on the assumption that a legacy PDCCH is transmitted in two OFDM symbols. Similarly, as shown in FIG. 7A, when two symbols correspond to one TTI unit, 6 TTIs may be generated, as shown in FIG. 7B, when three symbols correspond to one TTI unit, 4 TTIs may be generated and, as shown in FIG. 7C, when four symbols correspond to one TTI unit, 3 TTIs may be generated. Needless to say, in this case, first two OFDM symbols may be assumed to transmit a legacy PDCCH.

As shown in FIG. 7D, when seven symbols are configured with one TTI, one TTI of seven symbol units including a legacy PDCCH and seven subsequent symbols may be configured as one TTI. In this case, in the case of a UE that supports a sTTI, when one TTI includes seven symbols, it may be assumed that puncture or rate-matching is performed on two OFDM symbols positioned at a fore end for transmitting a legacy PDCCH with respect to a TTI (first symbol) positioned at a fore end of one subframe and it may be assumed that corresponding data and/or control information are transmitted in five symbols. On the other hand, it may be assumed that a UE is capable of transmitting data and/or control information all seven symbols without a punctured or rate-matched resource region with respect to a TTI (second slot) positioned at a rear end of one subframe.

Figure 8:
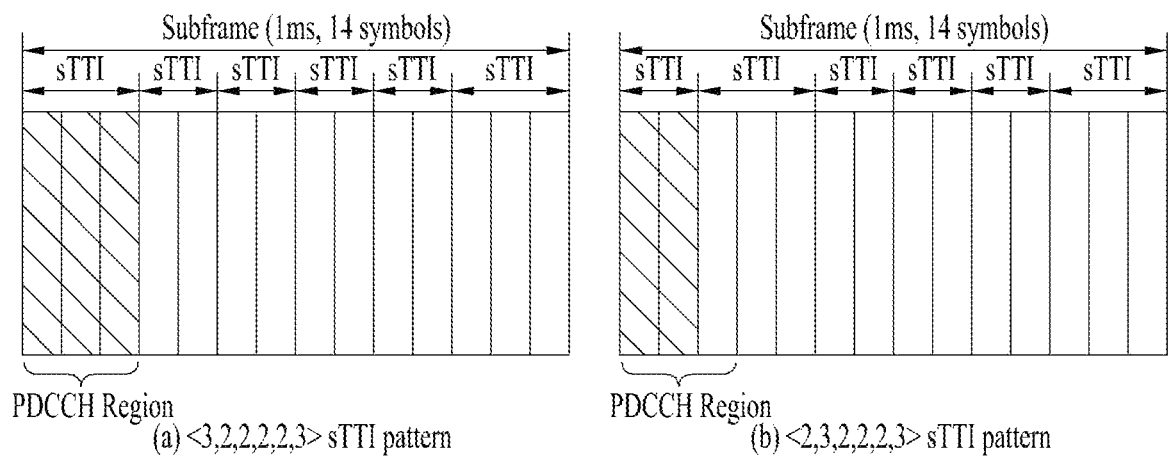
FIG. 8 is a diagram showing a DL subframe structure including a short TTI including two or three symbols.

According to the present invention, a sTTI including two OFDM symbols (hereinafter, "OS") and a sTTI including three OSs may be considered to include sTTI structures that are combined and present in one subframe, as shown in FIG. 8. The sTTI including 2-OS or 3-OS sTTIs may be simply defined as 2-symbol sTTI (i.e., 2-OS sTTI). Also, 2-symbol sTTI or 3-symbol sTTI may be simply referred to as 2-symbol TTI or 3-symbol TTI, respectively, and it is clear that these are TTIs shorter than the 1 ms TTI, which is the legacy TTI, which is the premise of the present invention. That is, in the specification, the term "TTI" is referred to instead of sTTI, the term TTI means the sTTI, and regardless of its name, what the present invention proposes is a communication scheme in a system composed of TTIs shorter than a legacy TTI.

Also, in this specification, numerology refers to defining a length of a TTI to be applied to the wireless communication system, a subcarrier interval and the like, or a parameter or a communication structure or system based on the parameter such as the defined length of the TTI or sub-carrier spacing.

As shown in FIG. 8A, a sPDCCH may also be transmitted depending on the number of symbols of a PDCCH in a <3,2,2,2,2,3> sTTI pattern. In a <2,3,2,2,2,3> sTTI pattern of FIG. 8B, it may be difficult to transmit an sPDCCH due to a legacy PDCCH region.

Collision Handling for UL Channels

Assume that transmission timings of a plurality of UL channels with different numerologies (e.g., a TTI length, a subcarrier spacing, etc.) overlap with each other on time, for example, the case in which transmission timings of UL channels with a longer TTI and a shorter TTI overlap with each other. A transmission timing of each channel may be is determined based on a DL/UL subcarrier spacing and a TTI and, thus, a time taken to assign power to each channel (to transmit PUCCH or PUSCH) may be changed and transmission of the shorter TTI may be started during transmission of the longer TTI. In this case, it may be difficult to consider power of the shorter TTI when power of the longer TTI is determined and, thus, (1) transmission of the longer TTI may be stopped or (2) symbols that overlap with the shorter TTI may be punctured/power-reduced and may be transmitted. However, in the former case, the longer TTI UL channel needs to be always dropped and, thus, UL latency for the longer TTI may be degraded and, on the other hand, in the latter case, as the number of symbols that overlap with the shorter TTI is increased, the reliability of the punctured/power-reduced longer TTI UL channel may be degraded.

A rule may be defined to assign higher priority to shorter transmission or higher QoS requirement channel when different numerologies are supported and two UL transmissions overlap with each other on time/frequency resources and, thus, one UL transmission needs to be selected in terms of one UE. As a method of determining priority between channels that collide with each other, the priority may be configured via high layer signaling or may be transmitted via dynamic scheduling information. In this case, a rule may be defined to transmit information related to a processing method of a channel with lower priority in DCI for scheduling a higher priority channel or to transmit the information in scheduling grant that is received later among UL grants for two channels. As another method, a rule may be defined to semi-statically configure information related to a processing method of a channel with lower priority to a UE and to process a channel with lower priority according to the configuration by the UE. Particularly, the processing method of the channel with lower priority may include dropping, puncturing, and/or suspending & resuming, etc. and, here, suspending & resuming may be different from puncturing in that transmission of the channel with lower priority is stopped and delayed.

More particularly, even if a specific behavior is indicated/configured via the dynamic indication and/or semi-static configuration, the processing method of the channel with lower priority may be differently determined depending on a time/frequency resource occupied region of a higher priority channel and/or stolen time/frequency resource region of a lower priority channel. For example, even if the channel with lower priority is indicated/configured to be punctured via the dynamic indication and/or semi-static configuration, when DMRSs of the higher priority channel and the lower priority channel overlap with each other, a rule may be defined to drop the lower priority channel.

More generally, operations of all channels may be differently applied depending on a time point of collision between corresponding channels rather than being determined depending on priority between the channels. That is, a specific period in a resource period of the lower priority channel may not have high priority or may not be preempted compared with the higher priority channel and, in this case, on-going transmission may be preferentially handled irrespective of priority. For example, when a UE is capable of skipping specific UL grant, upon receiving UL grant for the higher priority channel, the UE may piggyback and transmit data, to be transmitted to the lower priority channel, to the higher priority channel together or may transmit a corresponding payload through the higher priority channel.

When a channel transmitted without UL grant has higher priority in consideration of collision between the channel transmitted without UL grant and a channel transmitted based on UL grant, the lower priority channel may be transmitted based on UL grant for scheduling the lower priority channel as a processing method of the corresponding lower priority channel. In the corresponding case, an operation corresponding to the lower priority may be determined but priority of the corresponding UL grant may also be determined. The UE may determine priority with respect to transmission of a UL grant-free resource, to be transmitted by the UE, depending on corresponding priority information.

An example of the priority may be information on a bearer to which UL grant is mapped or Quality of Service (QoS) information. Alternatively, an example of the priority may be indication about whether preemption is possible or not.

When preemption is possible, an operation of the case in which preemption is performed may be indicated together. In this case, the higher priority channel or UL transmission without grant may be present or may not be present and, thus, the corresponding method may be assumed to be activated only the higher priority channel or UL transmission without grant is present. More particularly, when a UL resource is indicated via UL transmission without grant and UL grant, a rule may be defined to transmit data using a resource for UL transmission without grant and to skip the UL grant. Accordingly, dropping of an operation on the lower priority channel when UL transmission without grant and UL grant-based transmission collide with each other and dropping of collision between UL grant-based channels may be different. In the former case, dropping may include skipping in which UL transmission with respect to UL grant-based transmission is not started or may refer to skip (according to user selection). Alternatively, these operations may be related to configuration of priority between UL grant-based scheduling and a UL grant-free resource or scheduling grant received at two different transmission and reception points (TRPs).

In the corresponding case, a timing alignment (TA) value of the higher priority channel transmission and a TA value of the lower priority channel transmission may be different. Accordingly, when an operation such as puncturing, suspending & resuming, or the like is indicated, a gap for adjusting a TA value except for the higher priority channel transmission period may be assumed to be generated back or front (depending on a TA value, for example, when a TA of the higher priority channel is high, the gap is required front and, in an opposite case, the gap is required back). The corresponding gap may be formed by the UE by a TA difference or may be formed by emptying a gap configured by a network. Alternatively, the UE may notify the network about the TA difference and the network may configure an appropriate gap. The corresponding method may also be applied to collision between UL transmission without grant and UL grant-based transmission and the network needs to know the corresponding gap and, thus, when a TA value is changed, it may be considered that the UE reports the change in TA value to the network. According to a UL grant-free TA configuration, when a UE is capable of assuming an effective timing window of a TA value applied via UL grant-based transmission or the like from a corresponding TRP and the TA is not updated even when a corresponding timing elapses, a TA value may be configured to be unknown. When the TA value is unknown, the UE may perform transmission assuming a maximum TA value in the case of UL transmission without grant (the maximum TA value is assumed to be preset), may assume a CP to be increased by the maximum TA, or may transmit a preamble. In addition, a UL grant-free resource for this case may be separately set.

When transmission timings of a plurality of UL channels having different QoSs and/or requirements overlap with each other on time, a different method from existing handling may also be applied. For example, the case of channel transmission for traffic in which higher reliability and/or lower latency are required may be assigned with as high priority as possible to be prevented from collision with other channels.

In more detail, when PUCCH with respect to traffic in which a specific channel requires higher reliability and/or lower latency and a channel related to traffic in which relatively lower reliability and/or higher latency are required overlap with each other on time, a rule may be defined to transmit PUCCH by a UE, to assign lower priority to PUSCH, and to drop/suspend the PUSCH, or to perform puncturing, power reduction, or the like on the PUSCH, despite collision between PUCCH and PUSCH. This operation may also be applied to a situation in which, particularly, simultaneous transmission of PUCCH/PUSCH is not configured or UE capability is not satisfied. Even if simultaneous transmission of PUCCH/PUSCH is configured or possible (or irrespective simultaneous transmission configuration/capability), the operation may also be applied only to a power-limited situation. The operation may be applied only to a specific PUCCH format and, for example, may be applied to a PUCCH format of a large coverage group (and/or a small maximum payload size group).

When PUCCH is repeated/segmented and is transmitted over a plurality of TTIs in a time domain based on the operation, a rule may be defined to assign as high priority as possible during a first TTI or a plurality of TTIs including the first TTI among the plurality of TTIs and to assign as low priority as possible to PUCCH corresponding to a subsequent TTI. That is, when PUCCH is repeated/segmented and is transmitted over a plurality of TTIs in a time domain, priority may be differently configured according to a TTI for transmitting the PUCCH.

More generally, when transmission timings of a plurality of UL channels that have different TTI lengths, numerologies, QoSs, service types, and/or requirements overlap with each other on time, a rule may be defined to assign as high priority as possible to a channel that performs a repetition/segmentation operation and to drop/suspend the other (or some) channels or perform puncturing, power reduction, or the like on the other (or some) channels by a UE. Alternatively, in the case of a channel that performs a repetition/segmentation operation, high priority may not be always assigned, but a rule may be defined to assign high priority to some of channels/transmissions via a repetition/segmentation operation to ensure transmission and to assign low priority to the other some of the channels/transmissions.

When transmission timings of a plurality of UL channels with different TTI lengths, numerologies, QoSs, service types, and/or requirements overlap with each other on time, a rule may be defined to ensure the minimum number of times of repetition/segmentation of a channel that performs the repetition/segmentation operation. In more detail, even if the channel that performs the repetition/segmentation operation is pushed back on the priority is dropped/suspended or punctured, a UE may determine whether the channel is dropped/suspended or punctured in such a way that transmission with the smaller number of times than the number of times, which is predefined or set/indicated via set/indicated via high/physical layer signal is not performed. In this case, The UE may determine whether the channel is dropped/suspended or punctured in consideration of the number of transmission times of the channel during the repetition/segmentation operation up to now and/or the number of transmission times of the channel that performs the repetition/segmentation operation in the future.

For example, when the number of repetition times is 10 TTIs (all transmissions include once+repeated transmissions ten times=all transmissions eleven times) and a minimum repetition number of times to be ensured to be minimum is 5 TTI, if TTI # n and TTI # n+1 are transmitted and TTI # n+2 to TTI # n+6 are dropped in the case of transmission to TTI # n+10 from TTI # n, a rule may be defined not to drop a channel in which collision occurs in TTI # n+7 and the repetition operation is performed and which needs to be dropped and to drop/suspend the other channels.

As another method, a rule may be defined not to drop/suspend or puncture a corresponding channel by another channel up to a minimum number of repetition/segmentation times of a channel that performs the repetition/segmentation operation. With regard to a channel corresponding to a repetition/segmentation operation after the minimum number of repetition/segmentation times, a drop/suspension or puncturing operation may be determined according to a generally defined rule.

According to the current LTE standard, in a situation in which 1 ms PUSCH to be transmitted in subframe n+k via UL grant DCI in subframe n is scheduled, when SPUSCH is scheduled at a time point between subframe (n+1) and subframe (n+W_UL) (here, W_UL<=k), a rule may be defined in such a way that a UE does not expect transmission of 1 ms PUSCH. Related standard is stated in Reference below.

REFERENCE

For a serving cell, and a UE configured with higher layer parameter ul-TTI-Length, the UE is not expected to transmit subframe-based PUSCH in a given subframe corresponding to PDCCH/EPDCCH with uplink DCI format other than 7-0A/7-0B received in subframe n if the UE detects PDCCH/SPDCCH with uplink DCI format 7-0A/7-0B in any subframe from subframe n+1 to subframe n+WUL corresponding to a PUSCH transmission, and WUL is indicated by skipSubframeProcessing capability.

In this case, when UCI such as HARQ-ACK is expected to be transmitted in 1 ms PUSCH, the corresponding UCI transmitting method is proposed as follows.

Option 1: A rule may be defined to transmit UCI that is expected to be transmitted in 1 ms PUSCH, in 1 ms PUCCH in a subframe in which PUSCH is expected to be transmitted.

Option 2: A rule may be defined to transmit UCI that is expected to be transmitted in 1 ms PUSCH, in SPUCCH in sTTI (e.g., first sTTI in a subframe in which PUSCH is expected to be expected) predefined in a subframe in which PUSCH is expected to be transmitted or sTTI configured via a high layer signal. Here, a rule may be defined in such a way that a TTI length of SPUCCH complies with a UL TTI length configured in a PUCCH group/cell group including a corresponding serving cell or the corresponding serving cell. When sTTI PUSCH (i.e., SPUSCH) is scheduled at a corresponding SPUCCH transmitting time point, a rule may be defined to piggyback the UCI to SPUSCH and, particularly, the piggyback may be applied to the case in which simultaneous transmission of PUSCH and PUCCH is not configured.

Option 3: A rule may be defined to transmit UCI that is expected to be transmitted in 1 ms PUSCH, in 1 ms PUSCH in a subframe that is expected to be transmitted in PUSCH. However, the corresponding PUSCH may be channel transmission that does not include data (UL-SCH) and includes only UCI. In a situation without UL-SCH in existing LTE, the number of coded symbols to which HARQ-ACK of PUSCH is to be mapped may be determined according to Equation 1 below.

[Equation 1]

$$Q' = \min\left(\left\lceil \frac{O \cdot M_{sc}^{PUSCH} \cdot N_{symb}^{PUSCH} \cdot \beta_{offset}^{PUSCH}}{O_{CQI-MIN}} \right\rceil, N_{symb}^{UCI} \cdot M_{sc}^{PUSCH}\right)$$

Here, $O_{CQI-MIN}$ is a value obtained by summing a CQI bit number and a CRC bit number of all CSIs (processes) for receiving CSI trigger. When the present option is applied, the CSI trigger is not ensured to be received in the corresponding subframe and, thus, $O_{CQI-MIN}$ may be 0 and it may not be possible to acquire the above Q' value. Accordingly, when the present option is applied, $O_{CQI-MIN}$ may be replaced with a total sum of data bit number corresponding to each code block. This means that the data bit number is the same as an equation in which actual transmission is assumed and, in this regard, a data bit is not actually transmitted in the present option and, thus, a rule may also be defined to deliver HARQ-ACK in all PUSCH REs (e.g., $Q'=N_{symb}^{USI} \cdot M_{sc}^{PUSCH}$) or to more deliver HARQ-ACK bits in many REs (e.g., a method such as "total number of REs to which PUSCH needs to be mapped*offset" and, in this case, the offset is a value that is equal to or smaller than 1 and may be a value that is configured via a high layer signal or a predetermined value).

Option 3-1: A rule may be defined to transmit UCI that is included in 1 ms PUSCH and is expected to be transmitted, in 1 ms PUSCH in a subframe to be expected to be transmitted in PUSCH and, in this case, the corresponding PUSCH may be channel transmission that does not include data (UL-SCH) and includes only UCI. In particular, HARQ-ACK may be mapped only to four SC-FDMA symbols of an actual PUSCH and, thus, it may not be desired to perform transmission in all subframes to reduce power consumption of a UE and/or to reduce interference with respect to a UL channel from another UE.

Accordingly, in this case, a rule may be defined in such a way that a UE delivers power only in a symbol to which HARQ-ACK and DMRS are mapped and to reduce power in the other symbols (or to reduce to zero). As another method, a rule may be defined to partially transmit PUSCH to prevent power transient and, as a detailed example, a rule may be defined in such a way that a UE delivers and transmits power only in a time period from a first symbol (e.g., a third symbol in 1 ms PUSCH or a third symbol of a first slot in 1 ms PUSCH), to which HARQ-ACK in a subframe is mapped, to a last symbol (e.g., a twelfth symbol in 1 ms PUSCH or a fifth symbol of a second slot in 1 ms PUSCH) and reduces power in the other symbols (or to reduce to zero)

Option 3-2: A rule may be defined to transmit UCI expected to be transmitted in 1 ms PUSCH in the above situation, in 1 ms PUSCH in a subframe expected to transmit PUSCH and, in this case, the corresponding PUSCH may be channel transmission that does not include data (UL-SCH) and includes only UCI. In this case, a rule may be defined in such a way that a UE transmits PUSCH only in a RB including a RE to which UCI is mapped among RBs indicated via PUSCH resource assignment. This is for reducing power consumption of a UE and/or reducing interference with respect to a UL channel from other UEs.

Option 4: It may not be desired to drop HARQ-ACK of UCI included in 1 ms PUSCH. For example, when carrier agglomeration is configured, 1 ms PUSCH(s) including HARQ-ACK, to be transmitted in all carriers or serving cells, may be dropped, thereby rather increasing latency of a system. Accordingly, in a situation in which 1 ms PUSCH to be transmitted in subframe n+k through UL grant DCI in subframe n, when SPUSCH is scheduled in a time period between subframe n to subframe n+W_UL or subframe n+1 or subframe n+W_UL (here, W_UL<=k), a rule may be defined not to drop 1 ms PUSCH(s) including HARQ-ACK and to drop only 1 ms PUSCH to be transmitted in the other carriers or cells in which 1 ms PUSCH(s) including the HARQ-ACK is not transmitted, that is, 1 ms PUSCH that does not include HARQ-ACK (that is, to drop or not according to an embodiment of a UE).

Option 4-1: Alternatively, a rule may be defined to finally drop 1 ms PUSCH including HARQ-ACK among PUSCHs to be dropped. In other words, a rule may be defined to preferentially drop PUSCH that does not include HARQ-ACK among 1 ms PUSCHs scheduled in a plurality of carriers or cells. In addition, a rule may be defined to transmit corresponding HARQ-ACK (and/or other UCI including RI/CQI/PMI) in 1 ms PUCCH when PUSCH is dropped in the corresponding subframe in all carriers or cells up to 1 ms PUSCH including HARQ-ACK.

Option 5: In a situation in which 1 ms PUSCH transmitted in subframe n+k is scheduled via UL grant DCI in subframe n, a rule may be defined to transmit information on partial or entire CSI in 1 ms PUSCH without UL-SCH when SPUSCH is scheduled at a time point between subframe n to subframe n+W_UL or subframe n+1 to subframe n+W_UL (here, W_UL<=k) and CSI is expected to be transmitted in 1 ms PUSCH. In detail, at least RI may be transmitted in 1 ms PUSCH without UL-SCH or RI and CQI/PMI may be transmitted in 1 ms PUSCH without UL-SCH. This operation may be applied when only the above conditions are satisfied irrespective a condition such as the RB number and/or MCS index, etc. that are required to transmit "CSI on PUSCH without UL-SCH".

Collision Handling Between Transmissions with Grant and without Grant

A next-generation system has introduced a method of largely reducing transmission latency depending on an application field. In particular, introduction of grant-free UL transmission in which UL transmission according to determination of a UE instead of scheduling based on existing UL grant with respect to UL transmission has been considered. In more detail, an eNB may configure a resource set for UL transmission without grant and may notify a UE about the configuration and the UE may start UL transmission without UL grant. For convenience of description, this transmission method is referred to as "UL transmission without grant". The "UL transmission without grant" may include a semi-persistent transmission or SPS-like transmission method of existing LTE. On the other hand, for convenience of description, a UL (data) transmitting method via UL grant DCI including scheduling information of an eNB is referred to as "UL transmission with grant. When UL transmission without grant and UL transmission with grant with different TTI lengths and/or numerologies overlap with each other on time, a behavior of a UE is proposed as follows.

Option 1: As high priority as possible may be always assigned to "UL transmission without grant" irrespective of a TTI length and/or numerology. When simultaneous transmission is not possible, the UE may drop or suspend a channel corresponding to UL transmission with grant. This is because the UE is exposed to transmit a channel using a "UL transmission without grant" method with respect to traffic with relatively high latency requirement.

Option 2: When a channel using a "UL transmission without grant" method has a shorter TTI length and/or higher subcarrier spacing than a channel using a "UL transmission with grant" method, as high priority as possible may be assigned to the channel using the "UL transmission without grant" method. On the other hand, in an opposite case, that is, when the channel using the "UL transmission without grant" method has a longer TTI length and/or shorter subcarrier spacing than the channel using the "UL transmission with grant", as high priority as possible may be assigned to the channel using the "UL transmission with grant" method.

The aforementioned proposed methods may be included in one of embodiments of the present invention and, thus, may be considered as a type of proposed methods. The aforementioned proposed methods may be independently embodied but may be embodied in a combination (or union) of some of the proposed methods. A rule may be defined to indicate information on whether the proposed methods are applied (or information on the rule of the proposed methods) to a UE through a predefined signal (e.g., a physical layer signal or a high layer signal).

Figure 9:
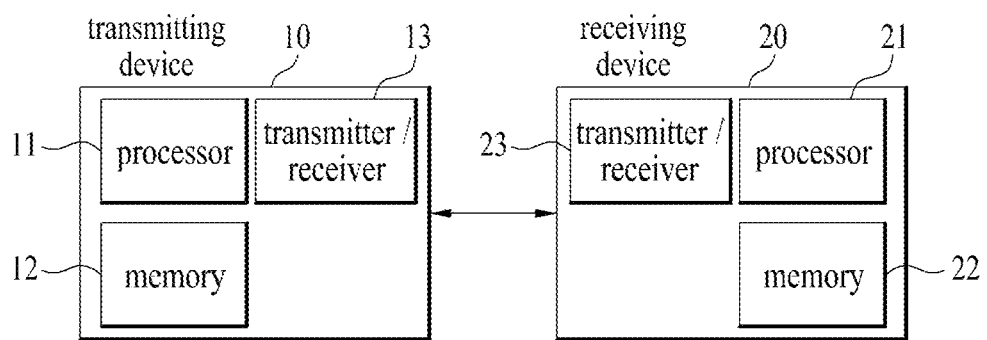
FIG. 9 is a block diagram showing an apparatus for embodying embodiment(s) of the present invention.

FIG. 9 is a block diagram illustrating a transmitting device 10 and a receiving device 20 configured to implement embodiments of the present invention. Each of the transmitting device 10 and receiving device 20 includes a transmitter/receiver 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the transmitter/receiver 13, 23 and the memory 12, 22 to control the memory 12, 22 and/or the transmitter/receiver 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitting device or the receiving device. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the transmitter/receiver 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiving device in the form of one or more layers. To perform frequency-up transformation, the transmitter/receiver 13 may include an oscillator. The transmitter/receiver 13 may include Nt transmit antennas (wherein Nt is a positive integer greater than or equal to 1).

The signal processing procedure in the receiving device 20 is configured as a reverse procedure of the signal processing procedure in the transmitting device 10. The transmitter/receiver 23 of the receiving device 20 receives a radio signal transmitted from the transmitting device 10 under control of the processor 21. The transmitter/receiver 23 may include Nr receive antennas, and retrieves baseband signals by frequency down-converting the signals received through the receive antennas. The transmitter/receiver 23 may include an oscillator to perform frequency down-converting. The processor 21 may perform decoding and demodulation on the radio signal received through the receive antennas, thereby retrieving data that the transmitting device 10 has originally intended to transmit.

The transmitter/receiver 13, 23 includes one or more antennas. According to an embodiment of the present invention, the antennas function to transmit signals processed by the transmitter/receiver 13, 23 are to receive radio signals and deliver the same to the transmitter/receiver 13, 23. The antennas are also called antenna ports. Each antenna may correspond to one physical antenna or be configured by a combination of two or more physical antenna elements. A signal transmitted through each antenna cannot be decomposed by the receiving device 20 anymore. A reference signal (RS) transmitted in accordance with a corresponding antenna defines an antenna from the perspective of the receiving device 20, enables the receiving device 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An transmitter/receiver supporting the Multiple-Input Multiple-Output (MIMO) for transmitting and receiving data using a plurality of antennas may be connected to two or more antennas.

In embodiments of the present invention, the UE or the terminal operates as the transmitting device 10 on uplink, and operates as the receiving device 20 on downlink. In embodiments of the present invention, the eNB or the base station operates as the receiving device 20 on uplink, and operates as the transmitting device 10 on downlink.

The transmitting device and/or receiving device may be implemented by one or more embodiments of the present invention among the embodiments described above.

According to one of these embodiments, a terminal for transmitting a UL signal with a short transmission time interval (TTI) length in a wireless communication system includes a receiver and a transmitter, and a processor that controls the receiver and the transmitter and, in this case, the processor receives DL control information including UL grant and, when transmission timing of a UL signal corresponding to the UL grant and transmission timing of a semi-persistent (SPS) UL signal overlap with each other, and when a TTI length of the first channel on which a UL signal corresponding to the UL grant is longer than a TTI length of a second channel in which the SPS UL signal, to perform UL signal transmission only on the second channel from the first channel and the second channel at the transmission timing.

Upon receiving second DL control information including second UL grant for scheduling transmission of physical uplink shared channel (PUSCH) with a shorter length than a TTI length of the first channel during a time period from a next subframe ("subframe # n+1") of a subframe in which the DL control information is received to a subframe ("subframe # n+k") in which a UL signal corresponding to the UL grant is to be transmitted, the processor may transmit the UL signal corresponding to the UL grant on a physical uplink control channel (PUCCH) in subframe # n+k.

Upon receiving second DL control information including second UL grant for scheduling transmission of physical uplink shared channel (PUSCH) with a shorter length than a TTI length of the first channel during a time period from a next subframe ("subframe # n+1") of a subframe in which the DL control information is received to a subframe ("subframe # n+k") in which a UL signal corresponding to the UL grant is to be transmitted, the processor may transmit a UL signal corresponding to the UL grant on a shortened PUCCH (SPUCCH) in an $n^{th}$ TTI with a shorter length than the TTI length of the first channel in subframe # n+k and, in this case, n may be preconfigured.

Upon receiving second DL control information including second UL grant for scheduling transmission of physical uplink shared channel (PUSCH) with a shorter length than a TTI length of the first channel during a time period from a next subframe ("subframe # n+1") of a subframe in which the DL control information is received to a subframe ("subframe # n+k") in which a UL signal corresponding to the UL grant is to be transmitted, the processor may transmit a UL signal corresponding to the UL grant on a first channel that does not include data in subframe # n+k.

Transmission power may be used only in a symbol to which the UL signal is mapped in subframe # n+k.

In addition, power may be used only in a resource block to which the UL signal is mapped among resource blocks indicated by the downlink control information in subframe # n+k.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention can be used for such a wireless communication device as a terminal, a relay, a base station, and the like.

The invention claimed is:

1. An uplink transmitting method performed by a terminal supporting a short transmission time interval (TTI) length in a wireless communication, the method comprising:
   receiving first downlink control information including a first uplink grant for scheduling transmission of a first physical uplink shared channel (PUSCH) with a first TTI length;
   receiving second downlink control information including a second uplink grant for scheduling transmission of a second PUSCH with a second TTI length which is shorter than the first TTI length; and
   based on the second downlink control information being received during a time period from a next subframe ("subframe #n+1") of a subframe in which the first downlink control information is received to a subframe ("subframe #n+k") in which the first PUSCH is to be transmitted, dropping the transmission of the first PUSCH.

2. A terminal configured to transmit an uplink signal with a short transmission time interval (TTI) length in a wireless communication system, the terminal comprising:
   a receiver and a transmitter; and
   a processor that controls the receiver and the transmitter, wherein the processor is configured to:
   receive first downlink control information including a first uplink grant for scheduling transmission of a first physical uplink shared channel (PUSCH) with a first TTI length;
   receiving second downlink control information including a second uplink grant for scheduling transmission of a second PUSCH with a second TTI length which is shorter than the first TTI length; and
   based on the second downlink control information being received during a time period from a next subframe ("subframe #n+1") of a subframe in which the first downlink control information is received to a subframe ("subframe #n+k") in which the first PUSCH is to be transmitted, drop the transmission of the first PUSCH.

3. At least one non-transitory computer-readable storage medium storing instructions that, based on being executed by a processor, perform operations comprising:

receiving, by a terminal supporting a short transmission time interval (TTI) length in a wireless communication, first downlink control information including a first uplink grant for scheduling transmission of a first physical uplink shared channel (PUSCH) with a first TTI length;

receiving, by the terminal, second downlink control information including a second uplink grant for scheduling transmission of a second PUSCH with a second TTI length which is shorter than the first TTI length; and based on the second downlink control information being received during a time period from a next subframe ("subframe #n+1") of a subframe in which the first downlink control information is received to a subframe ("subframe #n+k") in which the first PUSCH is to be transmitted, dropping, by the terminal, the transmission of the first PUSCH.

* * * * *